R. A. STOUTE, DEC'D.
J. G. C. WARD AND A. L. P. STOUTE, EXECUTORS.
WHEEL SPOKE REPAIR MEANS.
APPLICATION FILED MAR. 22, 1918.
1,350,528. Patented Aug. 24, 1920.
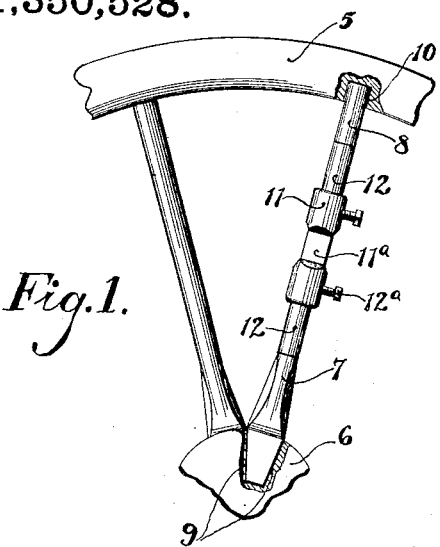
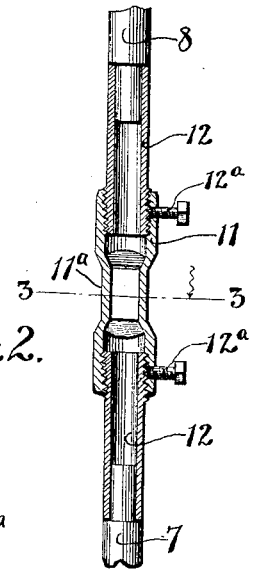
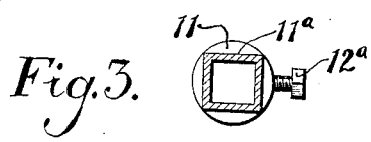
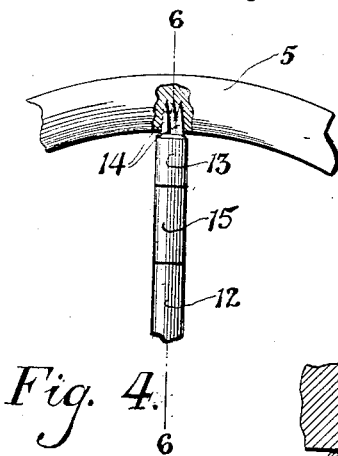
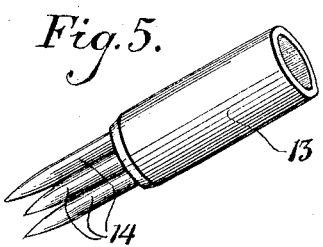
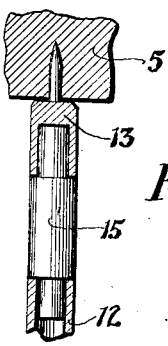
Inventor
R. A. Stoute.
Witnesses.
Wm. F. Kendrick.
By Chandler & Chandler
Attorneys.

UNITED STATES PATENT OFFICE.

RICHARD A. STOUTE, OF BRANKSMERE, BARBADOS, BRITISH WEST INDIES; JABEZ GRIFFITH CORBIN WARD AND ARTHUR LAURIE PARKINSON STOUTE, EXECUTORS OF SAID RICHARD A. STOUTE, DECEASED.

WHEEL-SPOKE-REPAIR MEANS.

1,350,528.  Specification of Letters Patent.  Patented Aug. 24, 1920.

Application filed March 22, 1918. Serial No. 224,041.

*To all whom it may concern:*

Be it known that I, RICHARD A. STOUTE, a subject of Great Britain, residing at Branksmere, Barbados, British West Indies, have invented certain new and useful Improvements in Wheel-Spoke-Repair Means; and I do hereby declare the following to be a full, clear, and exact description of the invention, such as will enable others skilled in the art to which it appertains to make and use the same.

This invention relates to new and useful improvements in means for securing spokes of vehicle wheels in place.

It is the object of this invention to provide a means for inserting a spoke in a vehicle, or for repairing a broken spoke, without necessitating the disassembly of the wheel.

It is more particularly an object to provide a coupling for connection with the hub and felly ends of a spoke, which is extensible so as to procure a proper tight engagement of the spoke ends in their respective sockets.

Inasmuch as breakage of a spoke is likely to occur immediately adjacent the felly whereby no projecting spoke portion is available for attachment of a coupling, it is a further object of this invention to provide a means for securing an outer spoke section to the felly in such manner that it may be connected with a coupling to provide an efficient repair for this type of breakage.

With the above and other objects and advantages in view, the invention resides more particularly in the novel combination, formation and arrangement of parts hereinafter described, and pointed out in the appended claims.

In the accompanying drawings,

Figure 1 is an elevational view of a portion of a wheel showing the improved repair means.

Fig. 2 is an enlarged longitudinal sectional view of the improved coupling.

Fig. 3 is a transverse sectional view therethrough on the line 3—3 of Fig. 2.

Fig. 4 is an elevational view of the outer portion of a repaired spoke and showing the repair means for attaching the spoke to the felly.

Fig. 5 is a perspective view of the felly attaching repair member.

Fig. 6 is a sectional view on the line 6—6 of Fig. 4.

Referring now more particularly to the drawings, 5 and 6 designate respectively the hub and felly of an ordinary vehicle wheel. My coupling is applicable for repairing a spoke which has been intermediately broken, or for replacing it in the event that no part thereof is adapted for further use in the wheel. In either case, there is utilized for repair inner and outer spoke sections 7 and 8 respectively engaged in the usual sockets 9 and 10 of the hub and felly, and the adjacent ends of these spokes are reduced, forming tenons and seating shoulders for an extensible coupling. These spoke sections may be cut from a new spoke or from an intermediately broken spoke.

The coupling comprises a central tubular member or pipe section 11, which is compressed at its central portion to form flat wrench faces 11$^a$. Threaded into the ends of this member are tubular socket members 12 whose outer ends are adapted to receive the tenons at the ends of the spoke sections 7 and 8 and to seat against the shoulders thereof. The coupling thus constitutes, in effect, a turn buckle.

In making the repair, the spoke sections are inserted in their respective hub and felly sockets, the socket members of the coupling are retracted within the central member whereby its length is less than the distance between the spoke sections, and the coupling is placed between the spoke sections and expanded to engage the adjacent spoke ends in the socket members, further expanding movement serving to wedge the spoke sections in the hub and felly sockets. A proper tight securement of a spoke within a vehicle wheel may thus be procured without disassembling the wheel to any extent. To hold the socket members of the coupling against retractile movement to permit a looseness of the spoke, thumb screws 12$^a$ are threaded in the ends of the central member for binding engagement with the socket members.

In the event that the spoke should be broken off at the felly, and no outer spoke section be available for repair, I provide a felly attaching socket member 13 which is formed with longitudinally extending spurs 14 at one end adapted to be driven into the felly, and this socket member is adapted to receive one reduced end of a short spoke section 15 having its other reduced end fitting into the outer socket member of the aforedescribed extensible coupling.

A comparatively simple device has thus been provided whereby an emergency repair of spokes may be made, merely with the use of a knife and an ordinary wrench for tightening the central member of the coupling, and by a person not necessarily skilled in wheelwright work. It is, however, noted that the compact and strong nature of the repaired structure renders my device practical for permanent repairs.

What is claimed is,

1. A device for repairing wheel spokes comprising a central member composed of a pipe section compressed between its ends to form wrench faces, spoke receiving socket members threadedly engaged in the ends of said pipe section, and means for holding said socket members against movement relative to the central pipe section.

2. A device for repairing spokes comprising a socket member having longitudinal spurs at one end for engagement in the felly of a wheel, in combination with an expansible coupling having sockets in its ends, one of which receives a spoke section leading to the wheel hub and the other of which and said socket member receive another spoke section.

3. An emergency spoke element for wheels comprising a spoke section adapted at one end to enter a socket in the hub and having a reduced tenon at its outer end, a socket member having spurs adapted to enter the felly, a second spoke section having tenons at its extremities whereof one engages said socket member, and an expansible coupling composed of a central member threaded at both ends and end members screwed onto the central member and having sockets in their outer ends receiving the tenons of said spoke sections.

In testimony whereof, I affix my signature, in the presence of two witnesses.

RICHARD A. STOUTE.

Witnesses:
LOUISE BOWEN,
MATILDA CHANDLER.